(12) United States Patent
Chen et al.

(10) Patent No.: US 8,023,258 B2
(45) Date of Patent: Sep. 20, 2011

(54) COMPUTER ENCLOSURE AND STORAGE DEVICE MODULE THEREOF

(75) Inventors: Xiao-Zhu Chen, Shenzhen (CN); Zhen-Xing Ye, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 223 days.

(21) Appl. No.: 12/580,266

(22) Filed: Oct. 16, 2009

(65) Prior Publication Data

US 2011/0069442 A1 Mar. 24, 2011

(30) Foreign Application Priority Data

Sep. 22, 2009 (CN) .......................... 2009 1 0307447

(51) Int. Cl.
*G06F 1/16* (2006.01)
(52) U.S. Cl. ................ 361/679.33; 248/298.1; 312/215; 711/149; 439/346

(58) Field of Classification Search ............... 248/298.1, 248/300, 231.9, 640, 214, 675, 225.11, 309.1; 361/679.33, 679.39, 679.58, 679.4, 679.31, 361/679.57, 679.36, 679.02, 679.32, 679.01, 361/679.34, 679.6, 679.41; 312/223.2, 265.6, 312/249.13, 215, 263; 360/97.02, 245.9, 360/245.1, 99.08, 251; 711/103, 115, 112, 711/114, 149, 147, 109; 345/26, 573; 439/353, 439/331, 346, 55, 248
See application file for complete search history.

(56) References Cited

U.S. PATENT DOCUMENTS

| | | | |
|---|---|---|---|
| 7,301,762 B2 * | 11/2007 | Han ........................ | 361/679.33 |
| 7,495,904 B2 * | 2/2009 | Liang et al. .............. | 361/679.39 |
| 7,738,254 B2 * | 6/2010 | Oyama et al. ................. | 361/725 |
| 2005/0040306 A1 * | 2/2005 | Chen et al. ................. | 248/298.1 |

* cited by examiner

*Primary Examiner* — Hung Duong
(74) *Attorney, Agent, or Firm* — Altis Law Group, Inc.

(57) ABSTRACT

A computer enclosure includes a case comprising a drive bracket housing a number of compact disc drives and a storage device module mounted in the drive bracket in the absence of installed disk drives. The storage device module includes a supporting frame fixed in the drive bracket, a backboard, and a number of data storage devices arranged in the supporting frame. The backboard provides connection of the data storage devices to a motherboard of the case.

10 Claims, 6 Drawing Sheets

COMPUTER ENCLOSURE AND STORAGE DEVICE MODULE THEREOF

BACKGROUND

1. Technical Field

The present disclosure relates to computer enclosures and, particularly, to a computer enclosure with a module receiving data storage devices.

2. Description of Related Art

A computer enclosure may include a drive bracket capable of housing three or more compact disc (CD) drives. However, more often than not, only one CD drive is installed, thus wasting space in the enclosure.

DETAILED DESCRIPTION

Figure 1:
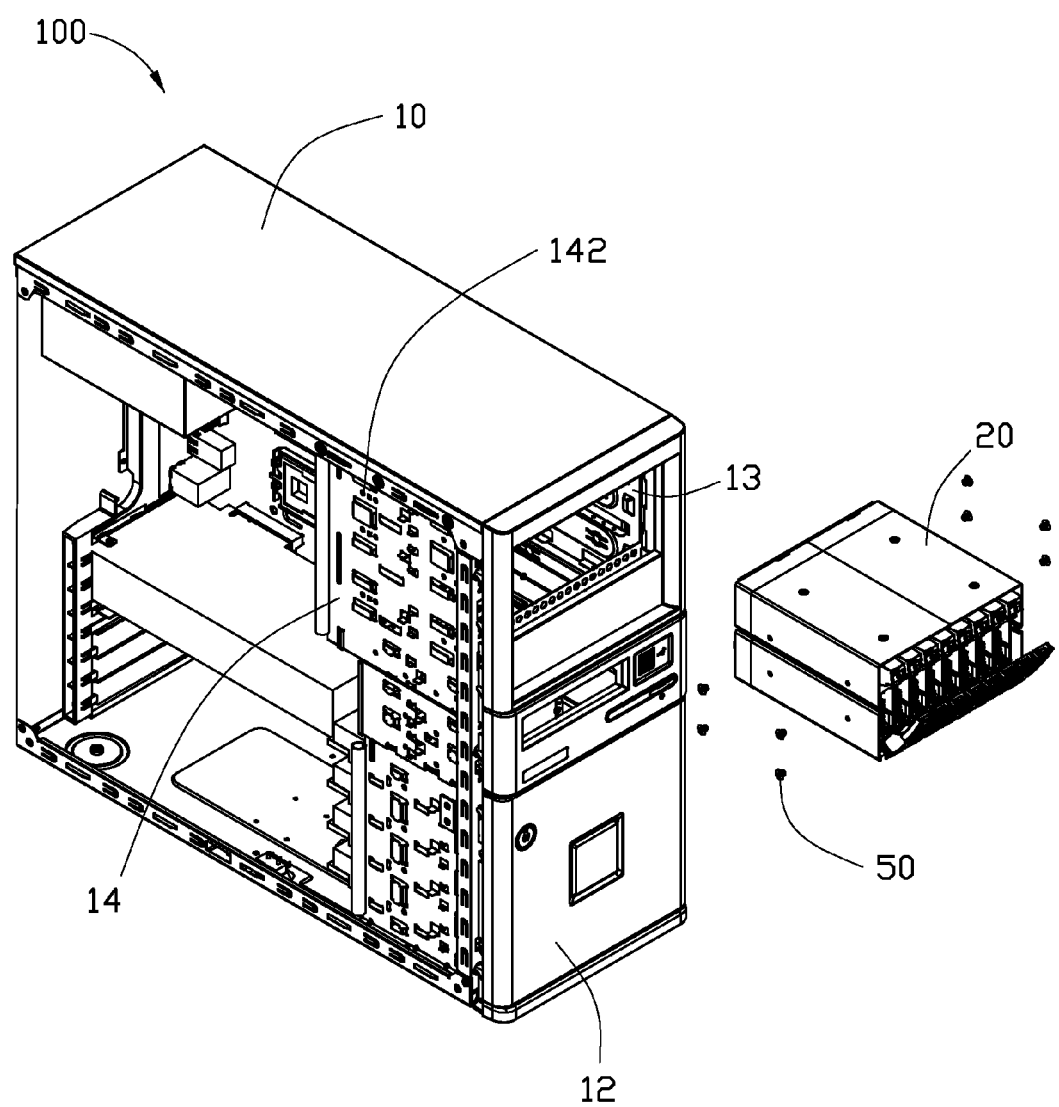
FIG. 1 is a partially exploded, isometric view of an embodiment of a computer enclosure as disclosed, the computer enclosure including a storage device module.

Referring to FIG. 1, an exemplary embodiment of a computer enclosure 100 includes a case 10 and a storage device module 20. The storage device module 20 may be a hard disk drive (HDD) module.

The case 10 includes a front panel 12, and a drive bracket 14 mounted on an upper portion of the front panel 12. The front panel 12 defines an opening 13 therein, corresponding to the drive bracket 14. The drive bracket 14 can house three compact disc (CD) drives (not shown) or the storage device module 20 and a CD drive. The drive bracket 14 defines a plurality of through holes 142 for mounting the CD drives or the storage device module 20. Mounting technology for the drive bracket 14 and the three CD drives is well known and thus not described here. In one embodiment, if only one CD drive is mounted in the drive bracket 14, the storage device module 20 can be mounted in the drive bracket 14 to fully utilize available space.

Figure 2:
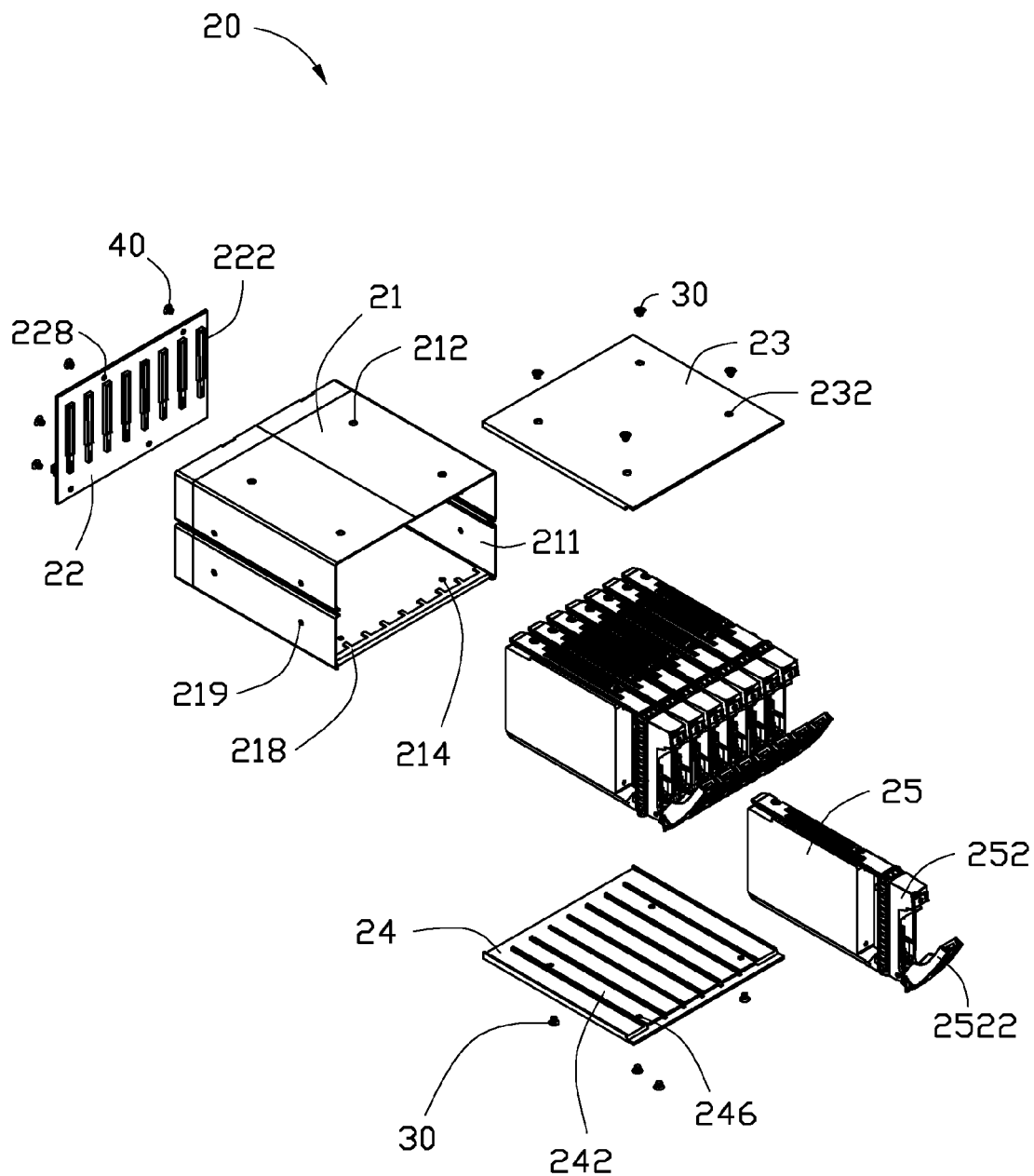
FIG. 2 is an exploded, isometric view of a storage device module as disclosed, utilized in a computer enclosure such as, for example, that of FIG. 1.
Figure 3:
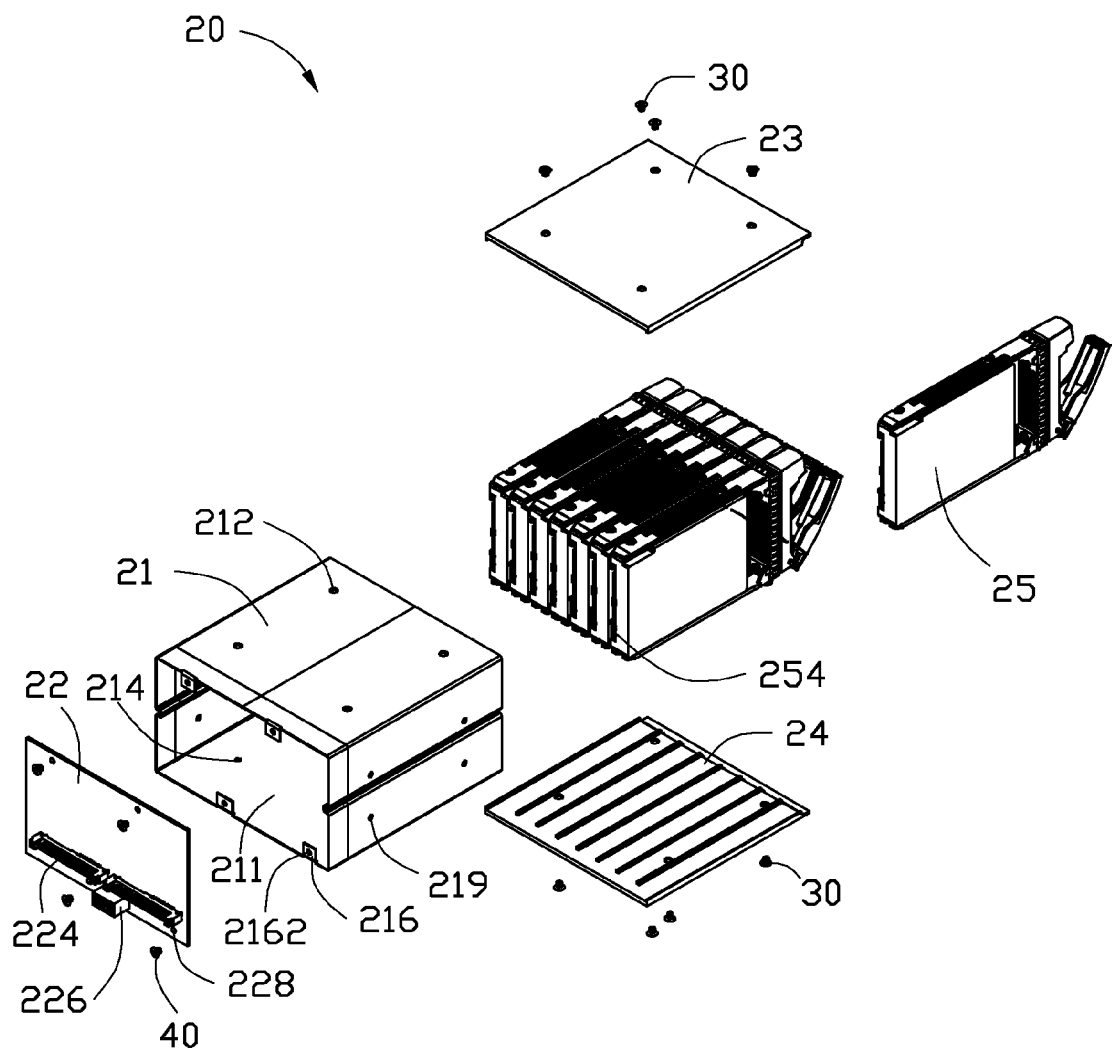
FIG. 3 is similar to FIG. 2, but viewed from another perspective.

Referring to FIGS. 2 and 3, the storage device module 20 includes a supporting frame 21, a backboard 22, two rail boards 23 and 24, and a plurality of data storage devices, such as HDDs 25 each with a handle locking configuration 252. The handle locking configuration 252 includes a handle 2522.

The supporting frame 21 is a hollow rectangular frame defining two opposite openings 211. Four fastener holes 212 are defined in a top wall of the supporting frame 21 for mounting the rail board 23. Four fastener holes 214 are defined in a bottom of the supporting frame 21 for mounting the rail board 24. Four fastener holes 219 are defined in each of opposite sides of the supporting frame 21. A blocking portion 218 extends from a front end of the bottom of the supporting frame 21. Two protrusions 216 each defining a through hole 2162 extend from a back end of each of the top and bottom of the supporting frame 21, for mounting the backboard 22.

The backboard 22 includes a plurality of sockets 222 on a front side thereof, for connecting connectors 254 of the HDDs 25. Two signal connectors 224 and a power connector 226 are mounted on a back side opposite to the front side of the backboard 22. The plurality of sockets 222 are electrically connected to the signal connectors 224 and the power connector 226. Four through holes 228 are defined in the backboard 22, corresponding to the through holes 2162 of the protrusions 216.

Each of the two rail boards 23 and 24 defines a plurality of sliding channels 242, for receiving the HDDs 25. Four fastener holes 232 are defined in the rail board 23, corresponding to the fastener holes 212 of the supporting frame 21. Four fastener holes 246 are defined in the rail board 24, corresponding to the fastener holes 214 of the supporting frame 21.

Figure 4:
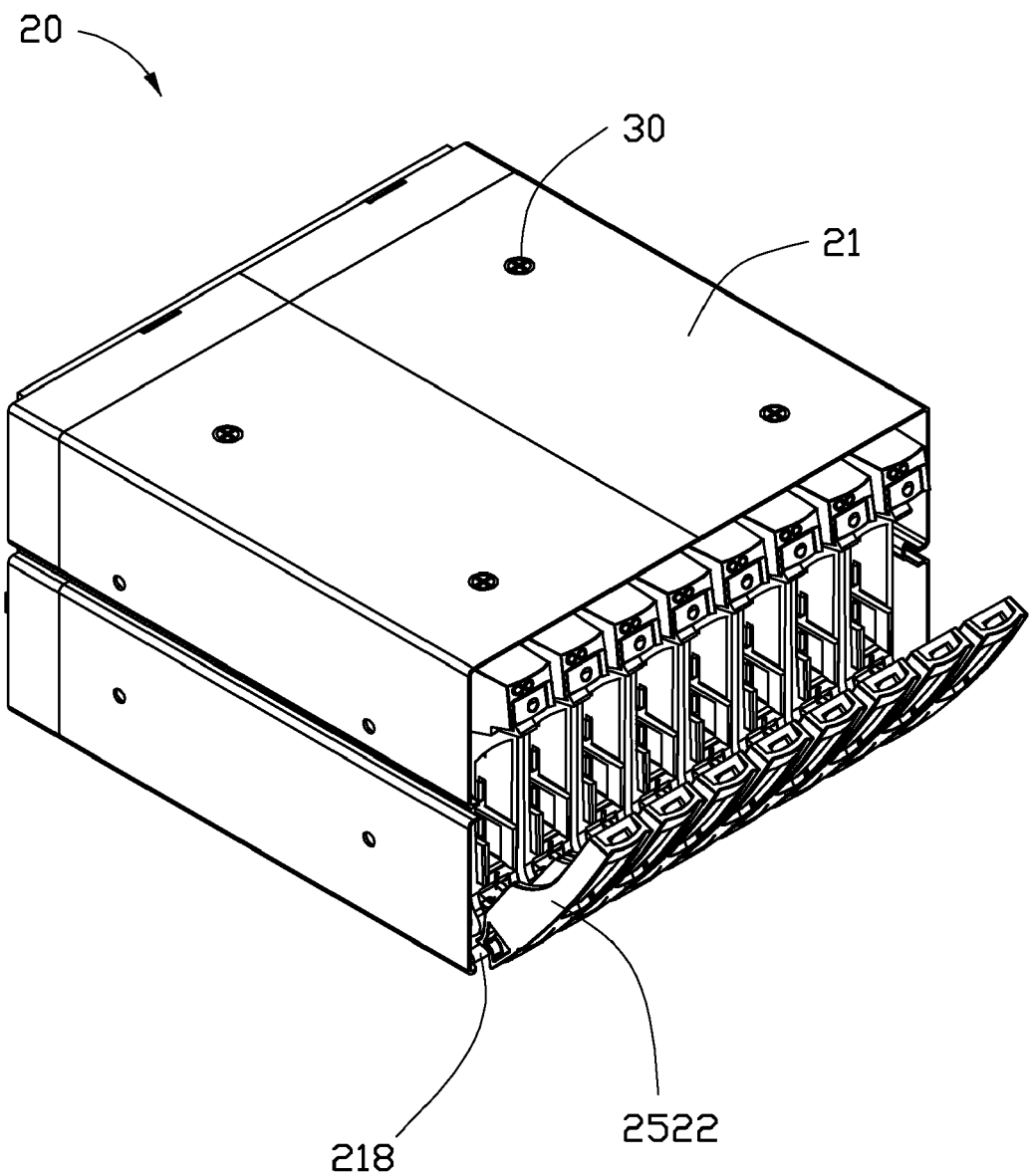
FIG. 4 is an enlarged view of the storage device module of FIG. 1.
Figure 5:
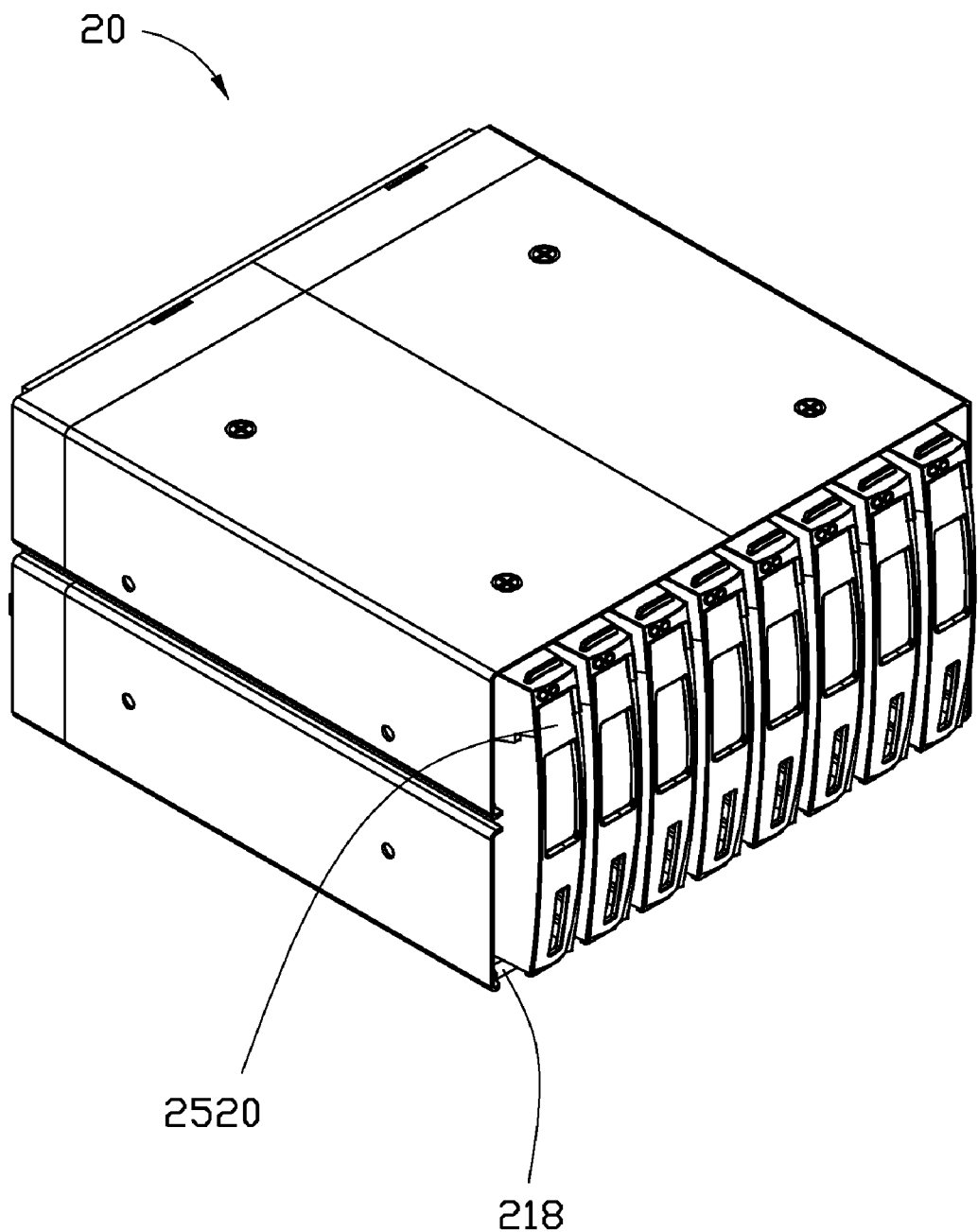
FIG. 5 is an assembled, isometric view of the storage device module of FIG. 4.

Referring to FIGS. 4 and 5, during assembly of the storage device module 20, the rail board 23 is attached to a bottom of the top of the supporting frame 21, four fasteners 30, such as screws, pass through the corresponding through holes 212 of the supporting frame 21, and engage the corresponding fastener holes 232 of the rail board 23. The rail board 24 is attached to a top of the bottom of the supporting frame 21, four fasteners 30 pass through the corresponding through holes 214 of the supporting frame 21, and engage the corresponding fastener holes 246 of the rail board 24. Thus, the rail board 23 is fixed to the bottom of the top wall of the supporting frame 21, and the rail board 24 is fixed to the top of the bottom wall of the supporting frame 21. Four fasteners 40 pass through the corresponding through holes 228 of the backboard 22, and engage the fastener holes 2162 of the corresponding protrusions 216 of the supporting frame 21. Thus, the backboard 22 is fixed to the back end of the supporting frame 21. The HDDs 25 are received in the supporting frame 21 along the sliding channels 242, and the connectors 254 are correspondingly received in the corresponding sockets 222 of the backboard 22. The handles 2522 of the HDDs 25 are moved to a locking position (see FIG. 5) to engage the blocking portion 218 of the supporting frame 21. Thus, the HDDs 25 are fixed in the supporting frame 21.

Figure 6:
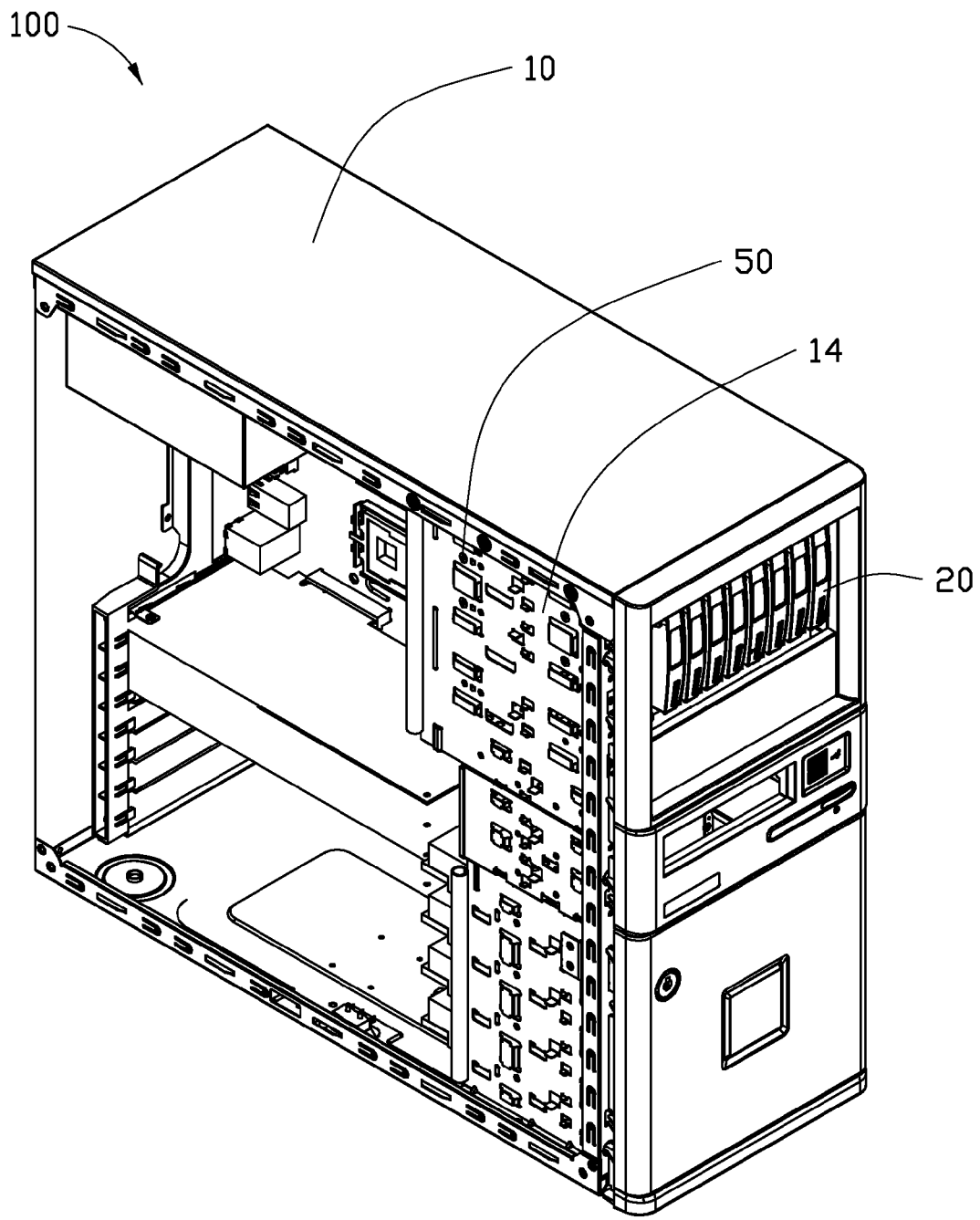
FIG. 6 is an assembled, isometric view of the computer enclosure of FIG. 1.

Referring to FIG. 6, during assembly of the computer enclosure 100, the storage device module 20 is received in the drive bracket 14 through the opening 13 of the case 10. Four fasteners 50 pass through the through holes 142 of the drive bracket 14, and engage the fastener holes 219 of the supporting frame 21. Thus, the storage device module 20 is fixed in the drive bracket 14. In use, the signal connectors 224 and the power connector 226 of the backboard 22 are connected to corresponding signal connectors and a power connector of a motherboard (not shown). The storage device module 20 is arranged in available space of the drive bracket 14 of the computer enclosure 100, efficiently utilizing the space of the computer enclosure 100.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A computer enclosure, comprising:
   a case comprising a drive bracket operable to house a plurality of compact disc drives; and
   a storage device module mounted in the drive bracket and occupying space for some of the plurality of compact disc drives uninstalled therein, the storage device module comprising:
      a supporting frame fixed in the drive bracket;
      a backboard fixed on a back end of the supporting frame, comprising a plurality of sockets mounted on a first side of the backboard, and two signal connectors and a power connector mounted on a second side opposite to the first side of the backboard; and
      a plurality of data storage devices arranged in the supporting frame, connectors of the plurality of data storage devices correspondingly connected to the plurality of sockets of the backboard.

2. The computer enclosure of claim 1, wherein the supporting frame is a hollow rectangular frame, from the back end of which a plurality of protrusions each defining a through hole extends, to which the backboard is fixed.

3. The computer enclosure of claim 2, wherein the storage device module further comprises two rail boards fixed on a top and a bottom of the supporting frame respectively to sandwich the plurality of data storage devices, wherein a plurality of sliding channels is defined in the two rail boards corresponding to the plurality of data storage devices and for the storage devices to slide therewithin.

4. The computer enclosure of claim 3, wherein the plurality of data storage devices comprises hard disk drives (HDDs).

5. The computer enclosure of claim 4, wherein the HDDs each comprise a handle locking configuration comprising a handle, wherein a blocking portion extends from a front end of the supporting frame, and the HDDs are fixed in the supporting frame via the handles engaging the blocking portion of the supporting frame.

6. A storage device module operable to be arranged in available space of a drive bracket of a case of a computer enclosure, the storage device module comprising:
   a supporting frame operable to be fixed in the drive bracket;
   a backboard fixed on a back end of the supporting frame, wherein the backboard comprises a plurality of sockets mounted on a first side of the backboard, and two signal connectors and a power connector mounted on a second side opposite to the first side of the backboard; and
   a plurality of data storage devices arranged in the supporting frame, connectors of the plurality of data storage devices correspondingly connected to the plurality of sockets of the backboard.

7. The storage device module of claim 6, wherein the supporting frame is a hollow rectangular frame, from the back end of which a plurality of protrusions each defining a through hole extends, to which the backboard is fixed.

8. The storage device module of claim 7, further comprising two rail boards fixed on a top and a bottom of the supporting frame respectively to sandwich the plurality of data storage devices, with a plurality of sliding channels defined in the two rail boards corresponding to the plurality of data storage devices and for the storage devices to slide therewithin.

9. The storage device module of claim 8, wherein the plurality of data storage devices comprises hard disk drives (HDDs).

10. The storage device module of claim 9, wherein the HDDs each comprise a handle locking configuration comprising a handle, wherein a blocking portion extends from a front end of the supporting frame, and the HDDs are fixed in the supporting frame via the handles engaging the blocking portion of the supporting frame.

* * * * *